Aug. 20, 1968  P. H. SMITH  3,397,817
DISPENSING APPARATUS WITH HEATING CHAMBER
Filed Jan. 6, 1967  5 Sheets-Sheet 1

INVENTOR
PETER HAROLD SMITH
BY PENDLETON, NEUMAN
SEIBOLD & WILLIAMS
ATTORNEYS

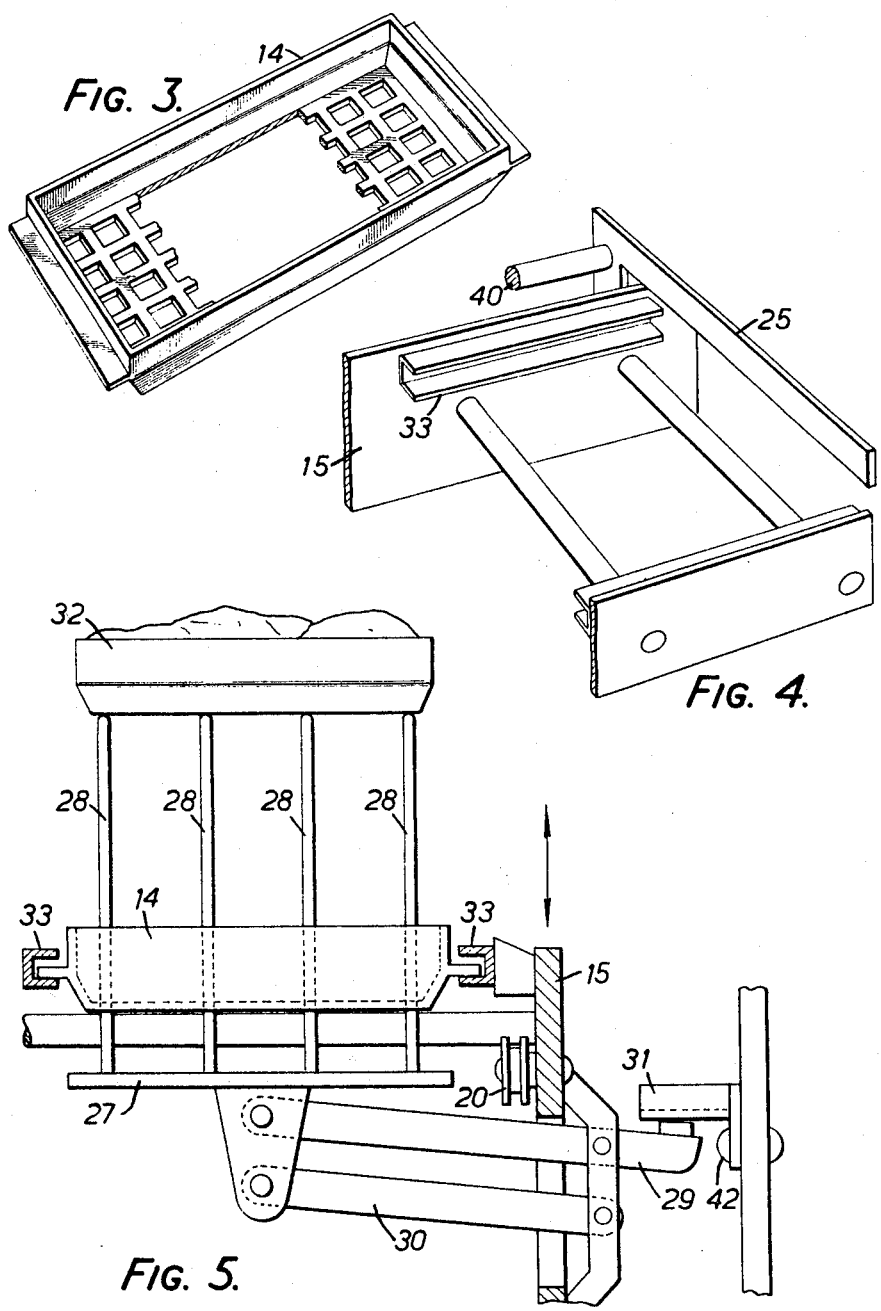

Aug. 20, 1968   P. H. SMITH   3,397,817
DISPENSING APPARATUS WITH HEATING CHAMBER
Filed Jan. 6, 1967   5 Sheets-Sheet 5

INVENTOR
PETER HAROLD SMITH
BY PENDLETON, NEUMAN
SEIBOLD & WILLIAMS
ATTORNEYS

United States Patent Office 3,397,817
Patented Aug. 20, 1968

3,397,817
DISPENSING APPARATUS WITH HEATING CHAMBER
Peter Harold Smith, Maidenhead, England, assignor to Microtherm Limited
Filed Jan. 6, 1967, Ser. No. 607,714
Claims priority, application Great Britain, Jan. 10, 1966, 1,030/66
8 Claims. (Cl. 221—150)

ABSTRACT OF THE DISCLOSURE

The exemplary vending apparatus described dispenses a variety of heated articles. The articles are transferred from a storage section to a first position on respective carriages, and removed from the carriages at said first position for heating in a microwave cavity. The transfer mechanism is reversible to reject the selected article.

---

This invention relates to vending machines and other dispensing apparatus, and is particularly applicable to dispensing hot snacks or other heated articles.

Dispensing apparatus is known which dispenses heated articles, and apparatus of this kind is described in my copending application No. 445,847, now Patent No. 3,335,656. The apparatus disclosed in that application includes a transfer mechanism for taking an article to be dispensed from a storage section of the apparatus, which is preferably refrigerated and positioning it in a heating chamber, where it is heated, for instance by means of radio frequency electromagnetic radiation.

Such apparatus is satisfactory except that it is only suited for dispensing one kind of article. The apparatus of the present invention is adapted for dispensing a variety of heated articles. It is particularly convenient if the transfer mechanism includes a plurality of similar carriage members on which the different articles are placed.

According to the present invention the dispensing apparatus is adapted for dispensing a variety of articles, and the transfer mechanism includes a plurality of similar carriage members on which the different articles are placed, means for moving one of said carriage members with a selected one of the articles thereon from the storage section to a first position where the selected article is removed from the carriage member and positioned in the heating chamber.

Preferably the selected article can be inspected in the heating chamber by the customer and either heated, or rejected, to this end the transfer mechanism can be reversed to return the selected article to its original position in the storage section. Preferably the customer can alternatively remove the selected article without heating.

Features and advantages of the invention will appear from the following description of an embodiment thereof, given by way of example with reference to the accompanying drawings, in which:

FIGURE 3 is a perspective view of a tray with part broken away;

FIGURE 4 is a schematic perspective view of part of a transport mechanism;

FIGURES 5 to 7 are schematic sectional views of parts of the transport mechanism.

Figure 1:
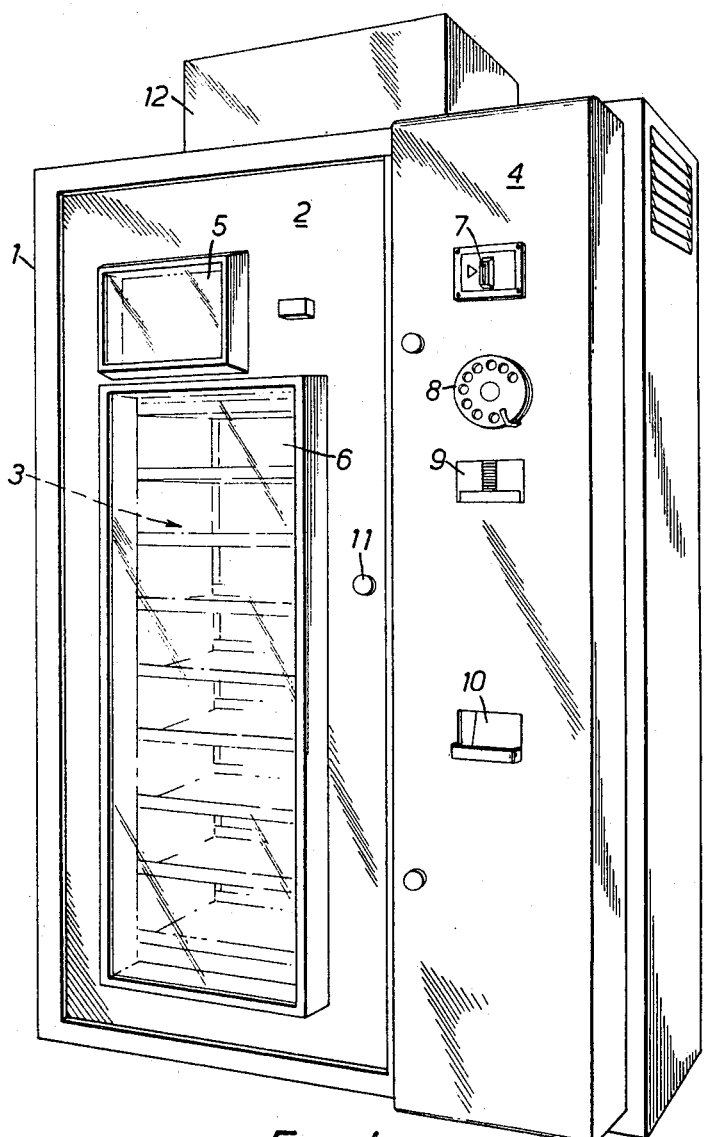
FIGURE 1 is a diagrammatic perspective view of a vending machine.

Referring now to FIGURE 1, this vending machine comprises a double-walled cabinet 1, the space between the cabinet walls being filled with a suitable thermal insulator, such as expanded polystyrene. The front of the cabinet 1 is formed with a hinged door 2, which gives access to a refrigerated storage structure 3, and a door 4 which gives access to the control mechanism. The door 2 has a window 5 which a customer can open to remove an article from the machine, and a panel 6 through which he can see the articles in the storage structure 3, the window 5 and panel 6 being of triplate glass which is an effective heat insulator. A number of different articles are stored on different shelves in the storage structure.

To select an article, coinage corresponding to the price of an article to be selected is inserted in an aperture 7, and is assessed for value by suitable devices (not shown) which may measure the dimensions, weight and other characteristics of the coins, for instance. The article desired is then selected by dialling a number on a rotary dial 8, electrical pulses from the dialling mechanism operating a stepping switch. The value of coinage inserted is compared with the price of the article selected; and if correct the transport mechanism extracts an article from the appropriate shelf in the storage structure 3 and transports it to the oven, where it can be inspected through the window 5. The customer may now reject the article by depressing a push-button 9, the coinage inserted being returned to him down a chute 10, and the rejected article being returned to the appropriate shelf in the storage structure 3. Alternatively, the customer can open the window 5 and remove the unheated article. Lastly, a push-button 11 may be depressed to close the oven door and start the heating cycle, and at the end of the heating cycle, the oven door is reopened and the customer can open window 5 and remove the heated article. A magnetron is used as the source of microwave energy, and this together with its associated power supplies, is mounted on top of the main cabinet, and thermally insulated from it, in a housing 12.

Figure 2:
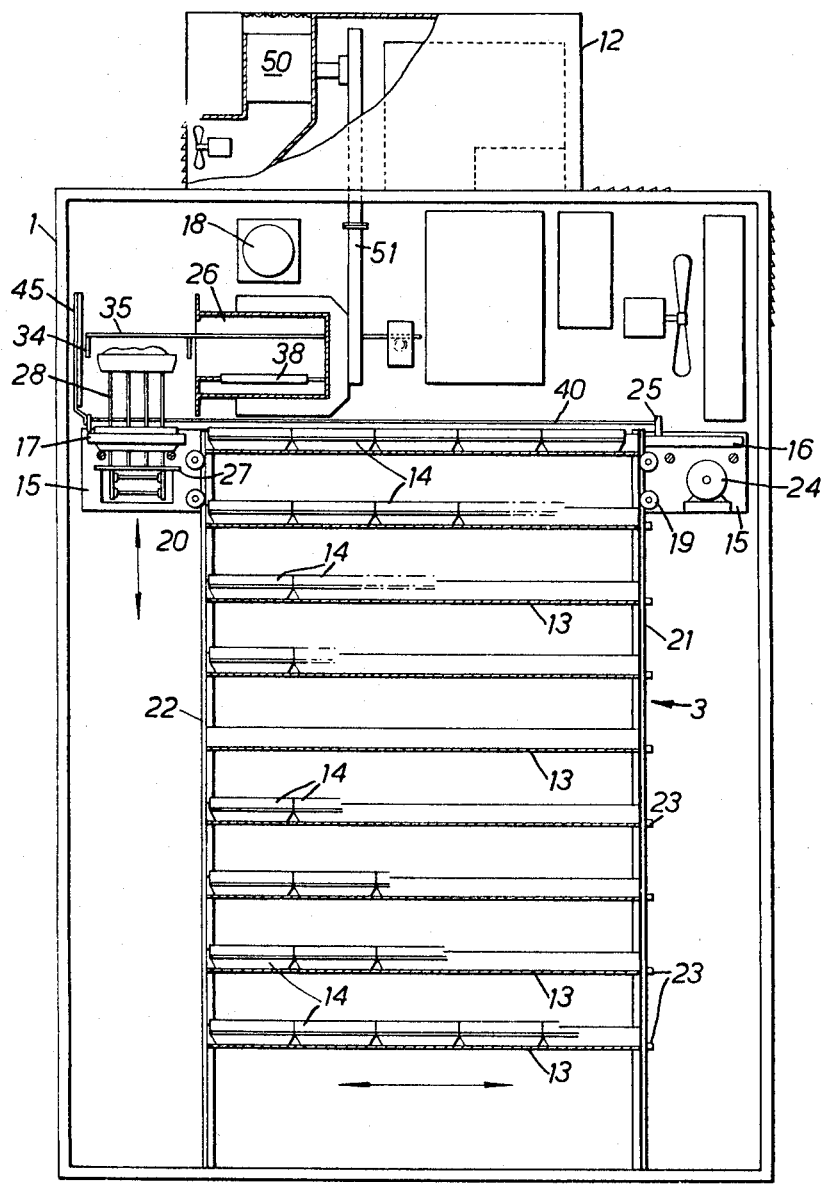
FIGURE 2 is a schematic sectional front view of the machine.

As shown in FIGURES 2 and 3 the storage structure 3 comprises a rack of shelves defined by U-section guide channels 13 which carry rows of shallow plastic trays 14 of standard size on which the stored articles are placed. The trays in each row are arranged side by side touching each other so that movement of an end tray can displace the whole row of trays. The guide channels 13 engage projections at the edges of the trays 14 to support the trays. The bases of the trays are perforated, the perforations permitting the air in the storage region to circulate to the bottoms of the articles on the trays.

The transport mechanism includes a lift carriage 15 guided for movement up and down the storage structure, and having platforms 16 and 17 at opposite ends. The lift is driven in this embodiment by a reversible electric motor 18 coupled to the life through a sprocket and chain drive and suitable gearing (not shown). The carriage is guided by rollers 19 and 20 which run on guide rods 21 and 22, the guide rods also conveniently serving as supports for the channels 13. Proximity switches such as 23 are provided at the end of each shelf which are responsive to the proximity of the lift carriage.

With the lift halted at a selected shelf, an electric motor 24 mounted under the platform 16 is energised, and sweeps a bar 25 over the platform 16, transferring an empty tray onto the end of the shelf. This action shifts the whole row of trays on the shelf, and a loaded tray at the opposite end of the shelf is transferred onto lift platform 17. This action completed, the lift is raised, carrying the extracted tray with an article on it to a position near the mouth of the oven chamber 26.

Figure 7:
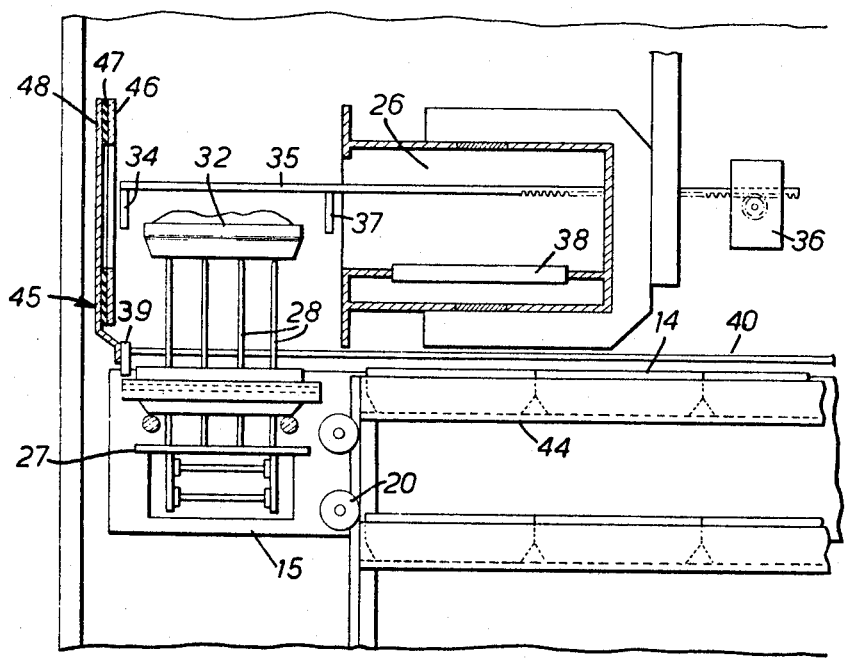
Figure 8:
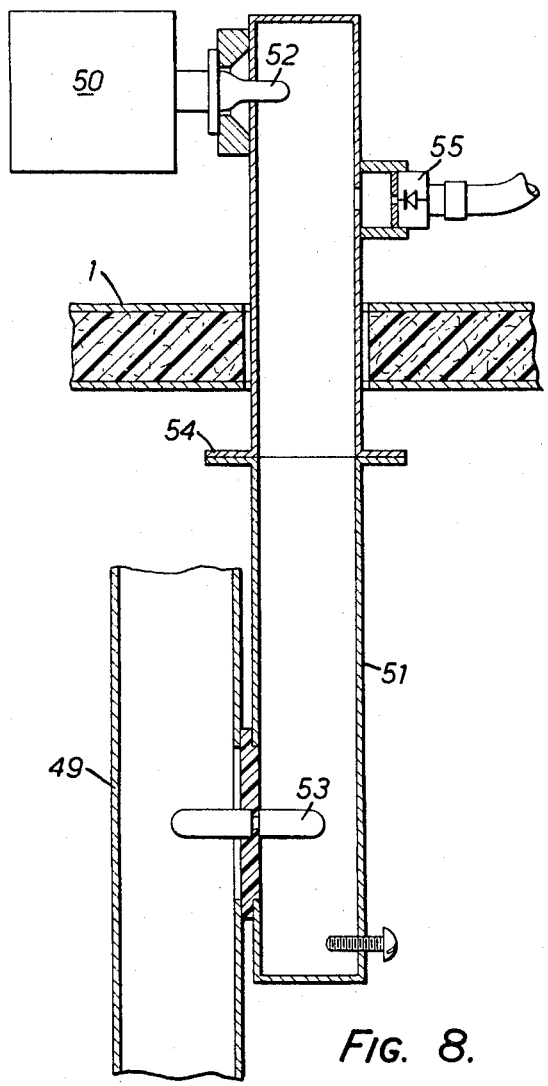
FIGURE 8 is a schematic view illustrating an arrangement for feeding microwave energy to the oven of the machine.

A mechanism removes the article to be heated from its tray before the article is inserted into the oven. This mechanism, as shown in FIGURES 5 and 7, includes a plate 27 carrying an array of tines 28, the plate being connected by a parallel linkage comprising link members 29 and 30 to the structure of the lift carriage 15. The end of link member 29 extends beyond the pivot point on carriage 15, and when the carriage rises towards the top of its travel, this end engages a stop 31 on the cabinet 1. As the lift continues to rise, the linkage pivots, projecting the tines 28 through the perforations in the base of the tray, and lifting the article, shown at 32, off the tray, the tray being gripped in the U-section channels 33 forming the platform 17.

When the lift is at the top of its travel, the mechanism is in the position shown in FIGURE 7. A signal generated when the mechanism arives in this position initiates the next phase of the operation in which an insertion bar 34 mounted on a rod 35 draws the article to be heated from on top of tines 28 into the oven chamber 26. The rod 35 extends through the rear wall of the oven chamber 26 and is coupled to a drive motor 36 by a rack and pinion coupling. A further bar 37 is mounted on the rod 35 to push the article out of the oven again when the motor is reversed. The oven has a turntable 38 for rotating the article during heating, and in order to enable the article to rotate freely with the turntable, the motor 36 is reversed when bar 34 has drawn the article to the correct position on the turntable, to leave both bars clear of the article during heating. The bars 34 and 37 and rod 35 are preferably formed from low-loss dielectric material. With this particlar mechanism, in order to position the different articles correctly in the oven chamber, they must be of similar sizes.

The customer can inspect the article in the oven through the window 5, and a lamp (not shown) illuminates the article through a window (not shown) in a wall of the oven chamber which is covered by wire mesh substantially impermeable to microwave radiation. The next operation of the machine follows on the choice made by the customer whether to reject the article in the oven, to take it unheated, or to have it heated.

If the customer depresses the reject button 9, the motor 36 is reversed and the bar 37 pushes the article out of the oven onto the tines 28. The motor 18 is then reversed to lower the lift back to the shelf from which the article originally came, and the article on its tray is then replaced on that shelf. To this end, a bar 39 extending over the platform 17 is connected by a tie rod 40 to the bar 25, and the motor 24 is reversed, sweeping the bar 39 over the platform 17 and shifting the row of trays to the right as seen in FIGURE 2. This action also replaces the empty tray from the end of the row on the lift platform 16.

Figure 6:
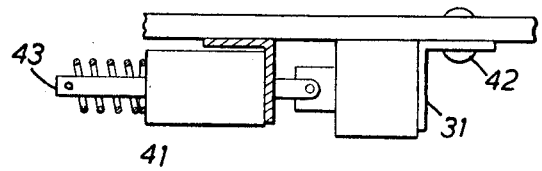

Alternatively, if the customer opens the access window 5, he can remove the article directly from the oven. It is arranged that the window 5 closes when the article has been taken by the customer; for instance, the window may be arranged to drop under gravity, and may conveniently be a sliding window. When the window closes at this stage, a solenoid 41 (FIGURE 6) is energised to pivot the stop 31 out of engagement with the lever 29. As shown in FIGURE 6, the stop 31 is pivoted on the cabinet at 42, and is connected to the armature 43 of the solenoid 41. The armature is spring loaded to hold the stop normally in a position where it will engage the lever 29. The disengagement of stop 31 from the lever 29 allows the tines 28 to drop clear of the tray on platform 17. The motor 24 is now operated to sweep the bar 39 over the platform 17 and transfer the tray from platform 17 onto a return shelf 44 which is filled with empty trays 14. This shifts the rows of trays on shelf 44 to the right as seen in FIGURE 2, and transfers the end tray onto lift platform 16.

Lastly, if the customer wishes to have the article heated, he can depress the button 11. This energises solenoid 41, allowing the tines 28 to drop out of the tray on platform 17, and closes the oven door. The door 45 is conveniently mounted on the bar 39, as shown in FIGURE 7, and the door is advanced over the mouth of the oven by operation of motor to seal the oven for mcrowave radiation. As the door advances, the bar 39 transfers the empty tray onto the return shelf 44. The oven door 45 can suitably be of the kind forming the subject of British Patent No. 977,776, and may for instance comprise a flexible metal plate 46 mounted on a resilient cushion 47 which is backed by a rigid plate 48. When the heating cycle is completed, the oven door is opened and the heated article may be removed through window 5. Also, the microwave electromagnetic energy is preferably fed to the oven chamber through a branched waveguide 49 coupled to mutually perpendicular radiator slots in the roof and floor of the oven chamber, as described and claimed in British Patent No. 977,777.

The magnetron 50 is conveniently coupled to a launching section 51 by a stub antenna 52 which introduces a basic TE10 mode into the waveguide. The launching section 51 is coupled to the branched waveguide 49 by a coupling antenna 53. The launching section extends through the inner and outer walls and thermal insulation layer of the cabinet 1, and is broken at 54 to allow the magnetron to be removed without disturbing the remainder of the apparatus. A crystal detector 55, of the kind described in our copending British application No. 14,157/65 may be used to monitor reflection of waves at impedance mismatches, for instance caused by the absence of an article from the oven chamber when the magnetron is energised. Such reflection can severely damage a magnetron, and the detector is preferably used to interrupt the operation of the magnetron.

I claim:

1. Dispensing apparatus for dispensing heated articles, comprising a heating chamber for receiving an article to be heated, means for supplying radio frequency electromagnetic heating energy to an article in said chamber, a storage section for storing said articles, and transfer means for moving an article from said storage section to said chamber, wherein the improvement comprises adapting the apparatus for dispensing a plurality of different articles, said transfer means including a plurality of similar tray members for carrying said different articles, tray transfer means for selectively moving one of said tray members with a selected one of said different articles thereon from said storage section to a first position, said tray transfer means including means for replacing said one tray member with another tray member as said one tray member is moved from its position in said storage section, whereby said storage section contains the same number of tray members located at the same positions within said storage section, and article transfer means for removing the selected article from the tray member at said first position and positioning the selected article in said chamber.

2. Dispensing apparatus for dispensing heated articles, comprising a heating chamber for receiving an article to be heated, means for supplying radio frequency electromagnetic heating energy to an article in said chamber, a storage section for storing said articles, and transfer means for moving an article from said storage section to said chamber, wherein the improvement comprises adapting the apparatus for dispensing a plurality of different articles, said transfer means including a plurality of similar tray members for carrying said different articles, tray transfer means for selectively moving one of said tray members with a selected one of said different articles thereon from said storage section to a first position, article transfer means for removing the selected article from the tray member at said first position and positioning the selected article in said chamber, manually operable rejection means for actuating said tray transfer means in reverse to return the selected article to its original position in the storage section, and manually operable acceptance means for initiating a heating cycle in which the selected article in said chamber is heated.

3. Dispensing apparatus according to claim 2 wherein said different articles are carried by said tray members in said storage section, the dispensing apparatus including tray return means for removing said tray members from said first position when empty and returning them to said storage section, said tray return means being operative in response to actuation of said acceptance means, and inoperative in response to actuation of said rejection means.

4. Dispensing apparatus according to claim 3 wherein the selected article is removable from said heating chamber unheated, the dispensing apparatus including access means responsive to removal of an article from said chamber to actuate sad tray return means.

5. Dispensing apparatus according to claim 3 wherein said heating chamber includes door means for sealing said heating chamber against leakage of said heating energy, said door means being coupled with said tray return means, whereby said door means is closed when said tray return means is operated.

6. Dispensing apparatus according to claim 3 wherein sad article transfer means includes first means for lifting the selected article off the tray member at said first position, and a second means for displacing the selected article substantially horizontally into said heating chamber.

7. Dispensing apparatus according to claim 6 wherein said tray members have perforated bases, said first means including at least one first member, lever means on which said first member is mounted, and a normally stationary abutment, said first member and said lever means moving with said tray transfer means relative to said abutment, and said lever means being displaceable by engagement with said abutment to project said first member through the tray member at said first position to lift the selected article off the tray member.

8. Dispensing apparatus according to claim 7 wherein said tray return means includes means for causing said abutment to be displaced out of engagement with said lever means, whereby to retract said first member from the tray member at said first position.

References Cited
UNITED STATES PATENTS

| | | | |
|---|---|---|---|
| 2,834,510 | 5/1958 | Cenotti | 221—88 X |
| 3,333,666 | 8/1967 | Murray et al. | 221—150 X |

STANLEY H. TOLLBERG, *Primary Examiner.*